(12) United States Patent
Hinz et al.

(10) Patent No.: US 7,877,984 B2
(45) Date of Patent: Feb. 1, 2011

(54) ENGINE-DRIVEN VEHICLE WITH EXHAUST EMISSION CONTROL

(75) Inventors: Andreas Hinz, Onsala (SE); Lennart Andersson, Varberg (SE)

(73) Assignee: Volvo Lastvagnar AB, Göteborg (SE)

( * ) Notice: Subject to any disclaimer, the term of this patent is extended or adjusted under 35 U.S.C. 154(b) by 708 days.

(21) Appl. No.: 11/577,199

(22) PCT Filed: Oct. 12, 2005

(86) PCT No.: PCT/SE2005/001521

§ 371 (c)(1),
(2), (4) Date: Aug. 30, 2007

(87) PCT Pub. No.: WO2006/041402

PCT Pub. Date: Apr. 20, 2006

(65) Prior Publication Data

US 2008/0271438 A1    Nov. 6, 2008

(30) Foreign Application Priority Data

Oct. 13, 2004  (SE) .................................... 0402499

(51) Int. Cl.
*F01N 3/00* (2006.01)

(52) U.S. Cl. ................ 60/286; 60/273; 60/285; 60/299; 60/301

(58) Field of Classification Search ............... 60/273, 60/284–286, 295
See application file for complete search history.

(56) References Cited

U.S. PATENT DOCUMENTS

| | | | |
|---|---|---|---|
| 4,963,332 A | 10/1990 | Brand et al. | |
| 6,311,484 B1 | 11/2001 | Roth et al. | |
| 6,327,851 B1 | 12/2001 | Bouchez et al. | |
| 2003/0101713 A1* | 6/2003 | Dalla Betta et al. | ............ 60/284 |
| 2003/0106306 A1 | 6/2003 | Nakatani et al. | |
| 2004/0040289 A1* | 3/2004 | Mazur et al. | .................. 60/295 |

(Continued)

FOREIGN PATENT DOCUMENTS

EP    1245817 A2    10/2002

(Continued)

OTHER PUBLICATIONS

International Search Report from corresponding International Application PCT/SE2005/001521.

(Continued)

*Primary Examiner*—Thomas E Denion
*Assistant Examiner*—Jesse Bogue
(74) *Attorney, Agent, or Firm*—WRB-IP LLP (57) ABSTRACT

A method and an arrangement are provided for maintaining the oxidation of NO to NO2 in an oxidation catalytic converter arranged in a vehicle, the vehicle including an internal combustion engine which in operation emits exhaust gases to an exhaust gas after treatment system including the oxidation catalytic converter. A predetermined quantity of hydrocarbon is delivered to the exhaust gas aftertreatment system or the engine over at least one predetermined time interval for the purpose of maintaining the working temperature or regenerating an exhaust gas aftertreatment unit. The quantity of hydrocarbon is delivered to the exhaust gas aftertreatment system or to the engine through an injection with at least one predetermined fragmentation frequency and an injection period in order to maintain an NO2 production in the exhaust gas aftertreatment system that prevailed immediately prior to said time interval for the hydrocarbon injection.

12 Claims, 5 Drawing Sheets

U.S. PATENT DOCUMENTS

2004/0187477 A1* 9/2004 Okugawa et al. .............. 60/277
2004/0187483 A1  9/2004 Dalla Betta et al.

FOREIGN PATENT DOCUMENTS

WO  0248512 A1  6/2002

OTHER PUBLICATIONS

Supplementary European Search Report for coprresponding EP 05 79 3304.

* cited by examiner

ENGINE-DRIVEN VEHICLE WITH EXHAUST EMISSION CONTROL

BACKGROUND AND SUMMARY

The present invention relates to a method for maintaining the quantity of NO that is converted to NO2 under different conditions in an oxidation catalytic converter arranged in a motor vehicle comprising an internal combustion engine, which in operation emits exhaust gases to an exhaust gas aftertreatment system comprising said oxidation catalytic converter. The method is intended for application in situations when a predetermined quantity of hydrocarbons is delivered to the exhaust gas aftertreatment system or the engine over at least one predetermined time interval as a temperature-boosting measure for heating up or regenerating one or more different exhaust gas aftertreatment units in the exhaust gas aftertreatment system.

The present invention also relates to an engine-driven vehicle comprising an internal combustion engine, which in operation emits exhaust gases to an exhaust gas aftertreatment system comprising an oxidation catalytic converter for oxidizing NO to NO2, a control unit and injection elements which are designed to inject hydrocarbons into the exhaust gas aftertreatment system, the control unit being designed to inject a predetermined quantity of hydrocarbons via the injection elements over at least one predetermined time interval.

The present invention also relates to a computer program for performing such a method with the aid of a computer.

The statutory requirements relating to diesel engines have been tightened up and will continue to become more stringent, particularly in relation to emissions of nitrogen oxide pollutants and particulate emissions.

The quantity of nitrogen oxides formed by the combustion of fuel in an engine cylinder depends on the combustion temperature. Higher temperatures lead to a greater proportion of the atmospheric nitrogen being converted into nitrogen oxides. The catalytic converters used on diesel engines and other engines that operate with excess air are only oxidizing. Since the exhaust gases contain oxygen it is difficult to be highly selective in reducing the nitrogen oxides. In addition to nitrogen oxides, other unwanted emissions formed in the combustion process include carbon monoxide (CO), hydrocarbons (HC) and particulates, primarily in the form of soot (C).

A known method for reducing the quantity of nitrogen oxides, which is based on exhaust gas aftertreatment, is the LNA NOx trap, (Lean NOx Adsorber). The LNA may also be referred to as the LNT (Lean NOx Trap). In this technique NO is first oxidized in an oxidation catalytic converter to form NO2, following which NO2 is stored in the trap in the form of nitrates. The storage of NO2 occurs when the engine is operating with excess oxygen. The NOx trap is then regenerated intermittently at predetermined intervals by allowing the engine to run with deficient oxygen, that is to say with an extra addition of hydrocarbon (usually the vehicle fuel) and/or reduced air flow, which heats up the nitrates and reduces the nitrogen dioxide NO2 caught in the NOx trap to nitrogen N2 and water H2O, see EP 1245817, U.S. Pat. Nos. 5,473,887 or 6,718,757, for example. Both the storage and the regeneration require a sufficiently high temperature in the NOx trap (slightly in excess of 2000 C for storage and approximately 3000 C for regeneration). At low engine loads (for example in town driving or in the case of an unloaded truck) the exhaust gas temperature will not be sufficient to keep the NOx trap at the necessary temperature. One way of boosting the temperature to a suitable level is then to inject hydrocarbons into the exhaust gas that is being burned catalytically in the exhaust gas aftertreatment system, so that the right temperature is reached. The hydrocarbons have a negative effect on the useful NO2 formation, with the result that the overall conversion of nitrogen oxides in the exhaust system diminishes during the warm-up phase.

Hydrocarbon can be supplied through an additional injection (post-injection) with open engine exhaust valve or via an injector arranged on the exhaust pipe.

Another known method of exhaust gas aftertreatment to which the formation of NO2 by means of an oxidation catalytic converter is central is CRT™ (Continuously Regenerating Trap). In this case particulates, that is to say soot and sulfur pollutant emissions, for example, are collected in a trap in which the soot can be converted to carbon dioxide CO2. NO2 here acts as oxidizing agent for the conversion of the particulates. In order for combustion of the soot to occur with the aid of NO2, the temperature of the aftertreatment system needs to be in excess of 2500 C. Here also, the temperature in the exhaust gas aftertreatment system can be boosted to a suitable level by the addition of hydrocarbons, which are burned in the catalytic converter, which nevertheless has a negative effect on the useful NO2 formation, so that the overall conversion of particulates in the exhaust gas aftertreatment system diminishes.

Other known exhaust gas aftertreatment methods to which the formation of NO2 is central are:
  LNC (Lean NOx Catalyst), which continuously reduces nitrogen oxides under oxygen-rich conditions,
  precious metal-coated particle filters,
  urea or ammonia-based SCR (Selective Catalyst Reduction) for NOx reduction, see U.S. Pat. No. 5,540,047, for example,
  hydrocarbon-based (HC-based) SCR (Selective Catalyst Reduction)

It is desirable to maintain the level of useful NO2 formation in the oxidation catalytic converter for as long as possible, so that the overall efficiency of the exhaust gas aftertreatment system increases, that is to say that the exhaust gas aftertreatment system is capable of further reducing the emitted quantity of NOx and particulates, for example.

The method according to the invention comprises a method for maintaining the oxidation of NO to NO2 in an oxidation catalytic converter arranged in a vehicle comprising an internal combustion engine, which in operation emits exhaust gases to an exhaust gas aftertreatment system comprising said oxidation catalytic converter, a predetermined quantity of hydrocarbons being delivered to the exhaust gas aftertreatment system or the engine over at least one predetermined time interval. The invention is characterized in that said quantity of hydrocarbons is delivered to the exhaust gas aftertreatment system or the engine through a fragmented injection with a fragmentation frequency in the interval 0.01 to 0.5 Hz and an injection period in the interval 1 to 10 seconds, in which a shorter injection period is used at a higher fragmentation frequency, with the aim of largely maintaining an NO2 production in the exhaust gas aftertreatment system (2, 22, 32) that prevailed immediately prior to said time interval for the hydrocarbon injection.

One advantage of the method according to the invention is that by selecting the correct fragmentation frequency and injection interval for different conditions when warming up or regenerating a catalytic converter or particle filter, arranged in the exhaust gas aftertreatment system, an earlier conversion of NO to NO2 is maintained in an oxidation catalytic converter for as long as possible, even during a warm-up or regeneration process, that is to say when warming up or regeneration is taking place through the injection of hydrocarbon into the exhaust gas aftertreatment system. By maintaining the earlier conversion of NO to NO2, the total quantity of NOx and particulates in the exhaust gases leaving the exhaust gas aftertreatment system will be further reduced. In the case of an exhaust gas aftertreatment system with LNA, the conversion of NO to NO2 in an oxidation catalytic converter means that the conversion of NO to NO2 is maximized, whereas if the exhaust gas aftertreatment system instead comprises an SCR, the conversion of NO to NO2 means that a 50% oxidation is attained.

A further advantage of the invention is that the hydrocarbon injected will be used more efficiently, which affords a reduced consumption of hydrocarbon (approximately 5%).

The invention also encompasses an arrangement in the form of an engine-driven vehicle having an exhaust gas aftertreatment system in which the conversion of NO to NO2 in an oxidation catalytic converter is maintained by the continuous delivery of hydrocarbon to the exhaust gas aftertreatment system.

The same advantages are obtained by the arrangement according to the invention as by the method according to the invention.

DETAILED DESCRIPTION

Figure 1:
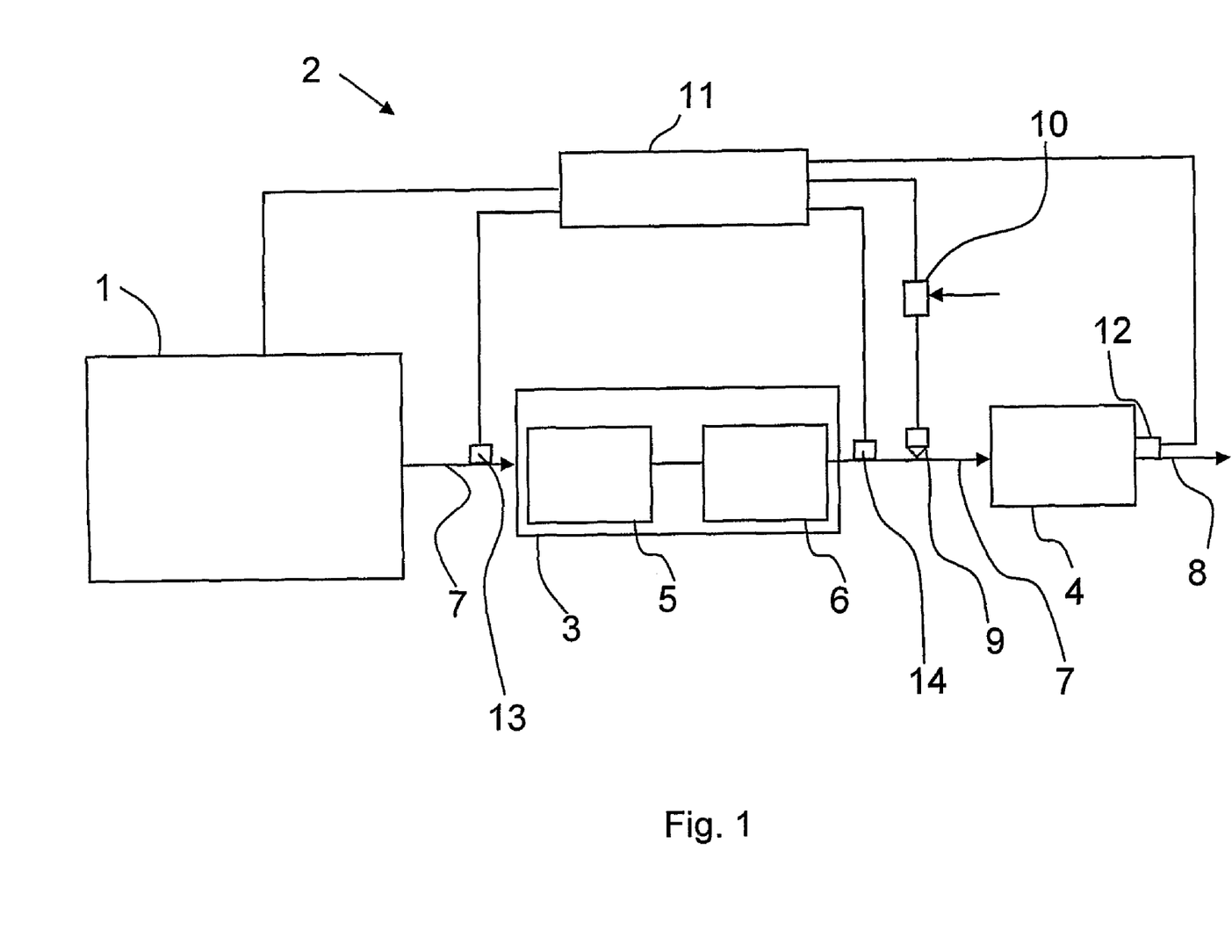
FIGS. 1, 2 and 3 each show a schematic representation of three different preferred embodiments of an exhaust gas aftertreatment system according to the invention.

FIG. 1 shows a preferred embodiment of the invention in which the combustion gases emitted from an internal combustion engine 1 are led into an exhaust gas aftertreatment system generally denoted by 2. The engine 1 is an engine that functions with excess oxygen, for example a diesel engine of the piston-cylinder type, in which the excess oxygen in the exhaust gases of the engine 1 is used to reduce the quantity of NOx and particulates (primarily soot) in the exhaust gases before they are emitted into the atmosphere. The exhaust gas aftertreatment system 2 is designed to reduce the quantity of nitrogen oxides and particulates in the exhaust gases from the engine 1. The main components of the exhaust gas aftertreatment system 2 comprise a CRT™ 3 and an NOx catalytic converter 4. In the exemplary embodiment shown the CRT 3 comprises an oxidation catalytic converter 5 and a particle filter 6. In the exemplary embodiment shown the NOx catalytic converter 4 is of the LNA type. The exhaust gases from the engine 1 are in turn led via an exhaust pipe 7 through a first stage in the form of the oxidation catalytic converter 5, a second stage in the form of a particle filter 6 and finally a third stage in the form of the NOx catalytic converter 4. From the NOx catalytic converter 4 the exhaust gases are led out into the atmosphere via the tail pipe 8.

The exhaust gases from the engine 1 are typically composed of various nitrogen oxides NOx, such as NO and NO2, but also hydrocarbons HC, carbon monoxide CO, carbon dioxide CO2, particulates and other combustion residues. The oxidation catalytic converter 5 in the first stage is preferably coated with precious metals such as platinum or palladium. The oxidation catalytic converter 5 oxidizes NO in the exhaust gases to NO2. The reaction in the first stage is shown by formula 1:

$$NO + \tfrac{1}{2}O_2 \rightarrow NO_2 \qquad (1)$$

Thus NO2 is formed, which is led on into the second stage consisting of the particle filter 6, for example of the ceramic monolith type in which the ducts are plugged so that the gas has to pass through a duct wall. In the particle filter 6, NO2 from the oxidation catalytic converter 5 reacts with particles in the exhaust gas, the particles being primarily in the form of soot, so that at least a proportion of the NO2 is reduced to NO, that is to say nitrogen monoxide, whilst the soot is oxidized to CO2. How much NO2 is reduced depends on the soot content of the exhaust gas and the quantity of soot that is caught in the filter. The reduction of NO2 to NO is therefore not one hundred percent. The exhaust gases coming out of the particle filter are usually composed of both NO2 and reduced NO2, that is to say NO, and CO2-The reaction in stage 2 can largely be illustrated by the formula $$2NO_2 + C \rightarrow 2NO + CO_2 \qquad (2)$$

The exhaust gases from the filter 6 then pass into a third stage, that is to say the NOx catalytic converter 4. In the exemplary embodiment shown the NOx catalytic converter 4 is an LNA, that is to say an NOx trap which is designed to collect on it the residual quantity of NO2 under oxygen-rich conditions, the NOx catalytic converter 4 by the addition of a reducing agent reducing the nitrogen dioxide NO2 caught in the NOx trap to nitrogen N2 and water H2O in gaseous form. The main process in stage 3 can be illustrated by the formula 3:

$$3NO_2 + 2H_2C \rightarrow 1\tfrac{1}{2}N_2 + 2H_2O + 2CO_2 \qquad (3)$$

The NOx catalytic converter 4 may be coated with a catalytic layer, the purpose of which is to oxidize any residual NO from stage 2 to NO2, so that the NO2 can then be stored in the NOx catalytic converter 4.

In the exemplary embodiment shown said reducing agent or heating agent preferably consist of fuel 1 for the engine and may be stored in a single tank (not shown) for injection, as required, into the exhaust pipe 7 by an injector 9 arranged between the particle filter 6 and the NOx catalytic converter 4. In the exemplary embodiment shown the injector 9 is pressurized by a pump 10. The injector 9 and the pump 10 are controlled by a control unit 11, which may also be designed to control the combustion process of the engine 1. If the exhaust gases reaching the NOx catalytic "converter 4 are too cold, owing to a low engine load, for example, the working capacity of the NOx catalytic converter 4 is reduced in terms of NO2 storage and the oxidation of NO to NO2 (if such an oxidation function exists). The control unit 11 may then opt to increase the temperature in the NOx catalytic converter 4 by injecting a predetermined quantity of hydrocarbon through the injector 9, so that functioning of the NOx catalytic converter 4 is ensured. The control unit 11 therefore adjusts the injection of hydrocarbon in order to increase or maintain the right temperature for NO2 storage in the NOx catalytic converter 4.

When the NOx catalytic converter 4 in the exemplary embodiment shown approaches or reaches its maximum NOx storage capacity, the control unit 11 will ensure that a predetermined quantity of reducing agent (hydrocarbon) is injected into the exhaust pipe 7, so that NO2 can be reduced to N2. In the exemplary embodiment shown the control unit 11 receives signals from an NOx sensor 12 arranged downstream of the NOx catalytic converter 4. The NOx sensor 12 detects the quantity of NOx in the exhaust gases and this enables the control unit 11 to indirectly detect the engine load. In this way reducing agent can be injected in a controlled manner into the exhaust pipe under desired conditions for the purpose of regenerating the NOx catalytic converter 4.

In the exemplary embodiment shown according FIG. 1 a temperature sensor 13 is arranged upstream of the oxidation catalytic converter 5 and a temperature sensor 14 is arranged between the filter 6 and the NOx catalytic converter 4 for registering the temperature before and after the CRT 3. The temperature sensors 13 and 14 are designed to deliver information on the temperatures to the control unit 11, which with the aid of this information is able to calculate when it is time for warming up or regeneration of the particle filter 6. The control unit 11 selects a suitable method for the prevailing conditions, for example by injecting hydrocarbon by means of an ordinary fuel injector (not shown) of the engine 1. The hydrocarbon preferably consists of the ordinary fuel for the vehicle and is suitably injected through a so-called post injection, which is monitored and controlled by the control unit 11. A predetermined quantity of injected fuel gives a specific temperature-boosting effect, which is required in order to achieve the correct working temperature or to regenerate the particle filter 6. In an alternative embodiment the sensor 13 may consist of a pressure sensor. In a further embodiment the sensor 13 may be a combined temperature and pressure sensor.

According to the present invention the hydrocarbon is injected in that the quantity of hydrocarbon calculated by the control unit 11 is injected into the exhaust pipe 7 or the engine 1 through a fragmented injection, the fragmentation frequency, injection period and flow of which are predetermined and stored in the memory unit (not shown) of the control unit 11. Since the fragmentation frequency may depend on the condition of the exhaust gas and the catalytic converter and may vary as a function of what NO conversion is to be achieved, it can be charted against any one or more variables that describe the condition. Information is also stored on the flow of hydrocarbon during a specific injection and the total time taken for a specific injection. Said memory unit therefore contains a table compiled by the manufacturer containing said predetermined data that is best suited to a specific temperature condition and exhaust gas condition in the exhaust gas aftertreatment system 2. In the embodiment according to FIG. 1 the purpose of the table according to the present invention is to maintain a high level of oxidation of the residual NO, which arrives in the NOx catalytic converter 4 from stage 2, even during the period when the hydrocarbon is being injected into the exhaust gas aftertreatment system 2. This is done by optimizing the fragmentation frequency, the injection period and the flow of the injector 9 for different conditions. This serves to maximize the oxidation of NO to NO2 through the exhaust gas aftertreatment system 2, which results in more efficient NOx reduction by the exhaust gas aftertreatment system 2. In the embodiment according to FIG. 1 the purpose of the table according to the present invention is furthermore to maintain a high oxidation level of the NO arriving in stage 1, that is to say the oxidation catalytic converter 5. This is done by optimizing the fragmentation frequency, the injection period and the flow in the injectors of the engine 1 for different conditions.

Figure 2:
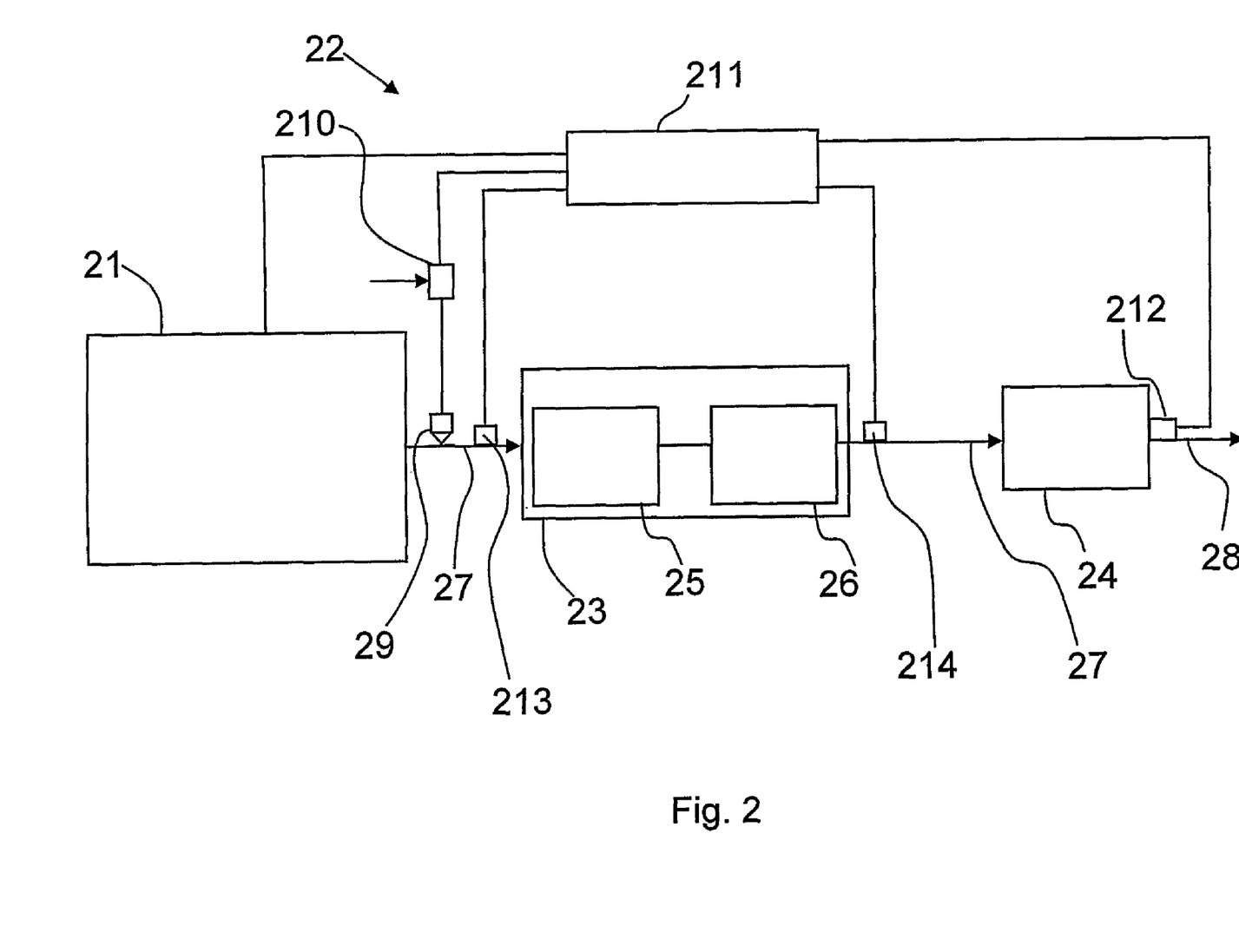

FIG. 2 shows an alternative preferred embodiment which is identical to the embodiment according to FIG. 1, except for the injection of the hydrocarbon. In the embodiment according to FIG. 2 the hydrocarbon is injected only through an injector 29 arranged between the engine 1 and the CRT 3. An injection of the hydrocarbon through the injector 29 is therefore optimized either for maximization of the oxidation of NO to NO2 in the oxidation catalytic converter 25, or for maximization of the storage of NO2 in the NOx catalytic converter 24, or for regeneration of the particle filter 26 and/or the NOx catalytic converter 24. Thus in the embodiment according to FIG. 2, as in the embodiment according to FIG. 1, corresponding tables according to the invention are stored in a memory unit in the control unit 211. The fragmentation frequencies are, however, adjusted for the embodiment according to FIG. 2.

Figure 3:
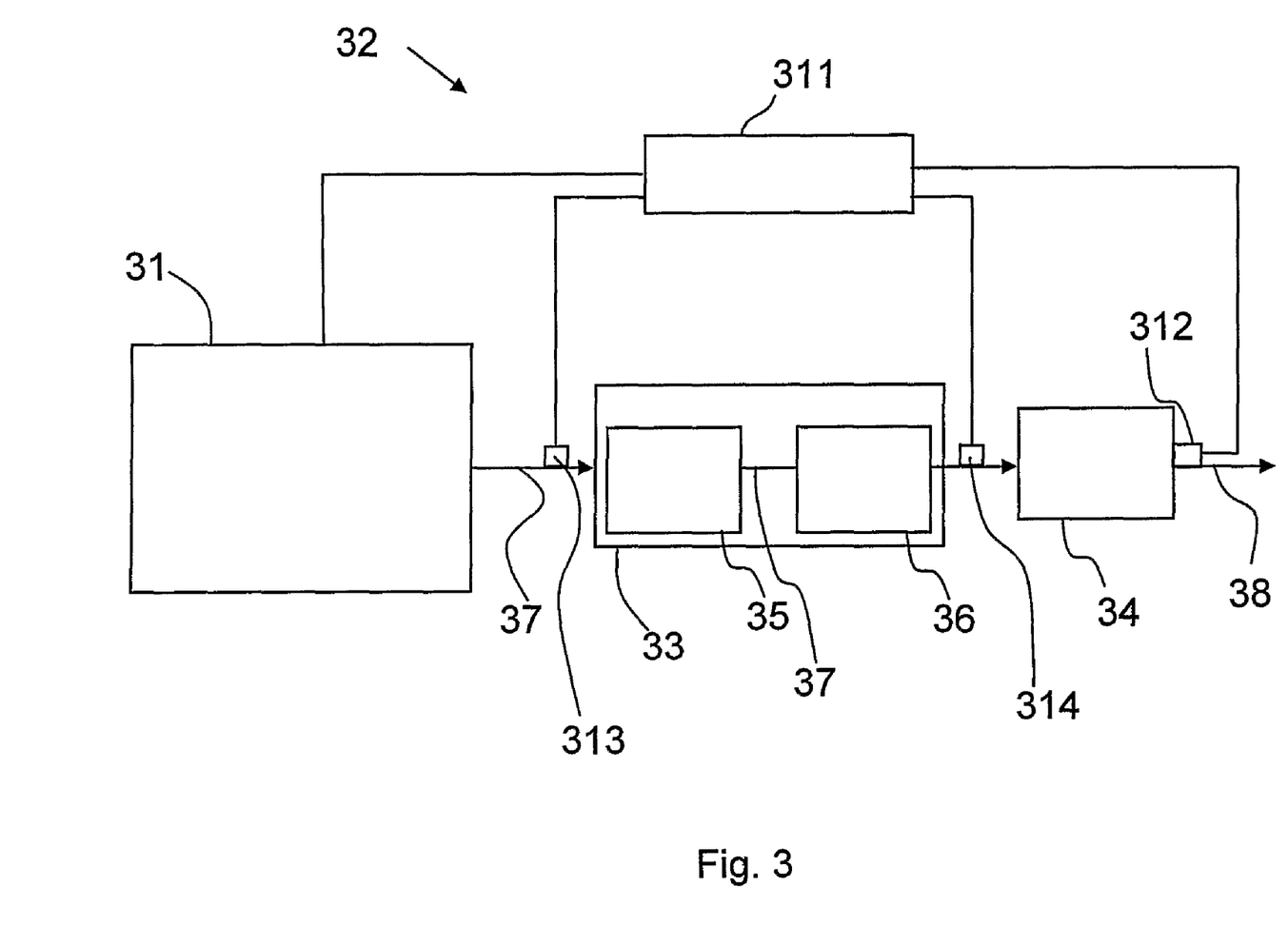

FIG. 3 shows yet another alternative, preferred embodiment which is identical to the two preceding embodiments except for the injection of the hydrocarbon. In the embodiment according to FIG. 3 the hydrocarbon is injected only through ordinary injectors (not shown) arranged in the engine 31 for each cylinder in the engine. The hydrocarbon therefore preferably consists of the ordinary fuel for the vehicle and is suitably injected through a so-called post -injection, which is monitored and controlled by the control unit 311.

According to the present invention therefore the hydrocarbon is injected in the same way as in the two embodiments shown previously in that the quantity of hydrocarbon calculated by the control unit 311 is injected into the exhaust pipe 37 through a fragmented injection, the fragmentation frequency, injection period and flow of which are predetermined and stored in the memory unit (not shown) of the control unit 311. The table compiled by the manufacturer containing said predetermined data which are best suited to a specific temperature condition and exhaust gas condition in the exhaust gas aftertreatment system 32 is here adapted to the embodiment according to FIG. 3. The table according to the present invention for the embodiment according to FIG. 3 is therefore optimized either for maximization of the oxidation of NO to NO2 in the oxidation catalytic converter 35, or for maximization of the storage of NO2 in the NOx catalytic converter 34, or for regeneration of the particle filter 36 and/or the NOx catalytic converter 34.

Figure 4:
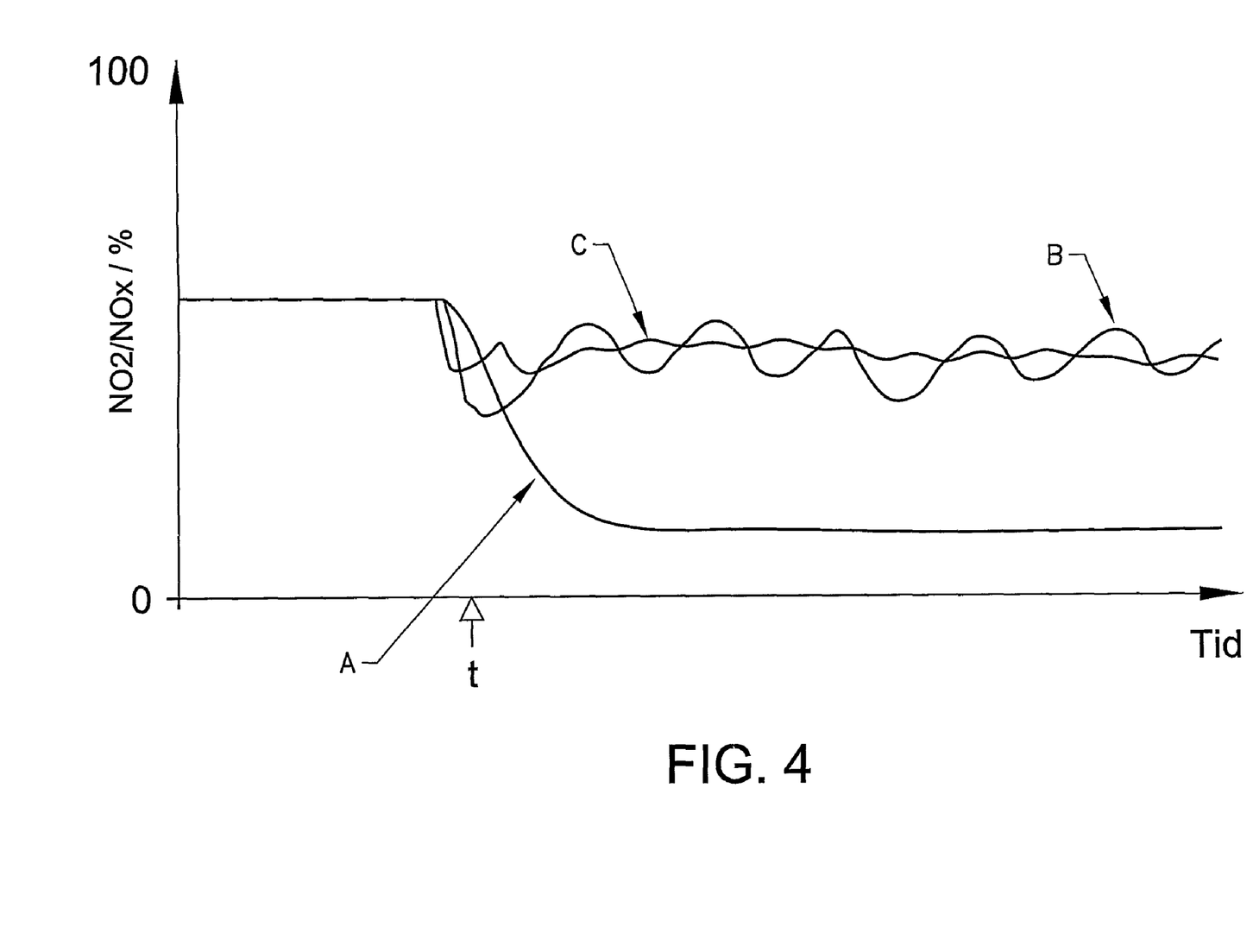
FIG. 4 shows a diagram of the NO2 content downstream of an oxidation catalytic converter in the state of the art and according to the invention.

For design reasons, injectors according to the state of the art (of the needle valve type, for example) arranged on the exhaust pipe usually have an opening frequency which can typically be in the order of tens of Hz and which can be regarded, in principle, as continuous injection. Such an injection of hydrocarbon or reducing agent interferes substantially with the formation of NO2. An injection through the engine in the state of the art also acquires a typical frequency of 10-100 Hz, depending on the engine speed. According to the invention the fragmentation frequency is adjusted in order to maintain the formation of NO2 for as long as possible. The fragmentation frequencies, injection period and flow optimized for the various conditions are compiled through tests on different embodiments of the engine and exhaust system. FIG. 4 shows a diagram with, on the y-axis, the percentage NO2 content downstream of a certain catalytic converter coated with a catalytic coating, which oxidizes No to NO2. The x-axis shows the time. Over a certain period t a predetermined quantity of hydrocarbon has been injected upstream of the catalytic converter in three different instances, each with a different fragmentation frequency. FIG. 4 shows three curves demonstrating how the NO2 content varies downstream of the catalytic converter in the three different cases. The injection according to curve A has "continuous" injection with an opening frequency of 30 Hz, that is to say this curve shows what happens in the case of an injection according to the state of the art. Curve A shows that the NO2 content downstream of the oxidation catalytic converter falls drastically when the hydrocarbon is injected. The exhaust gas aftertreatment system according to this embodiment therefore has an impaired efficiency. Curve B shows an injection with a low fragmentation frequency (0.1 Hz). In this case the injection occurs for 1-2 seconds with an opening frequency of 30 Hz and for 8-9 seconds with the injector fully closed. Here, upon injection, the NO2 content does not fall anything like as much as in curve A. It has been possible to largely maintain the production of NO2. Curve C shows an injection with a moderately high fragmentation frequency (approximately 0.25 Hz). It has been possible to maintain the production of NO2 somewhat further compared to curve B.

In order to be able to maintain the production of NO2 even during the period when hydrocarbon is being injected, the best results are preferably achieved with a fragmentation frequency in the interval 0.01 to 0.5 Hz and with an injection period in the interval 1 to 10 seconds. The injection period is preferably shorter, that is to say closer to the lower limit in said injection interval, at a higher frequency in said fragmentation frequency interval. A control unit programmed according to the invention, as in the exemplary embodiment shown, preferably calculates the flow and the injection period from a predetermined target temperature for an exhaust gas aftertreatment system and from the current exhaust gas temperature.

Figure 5:
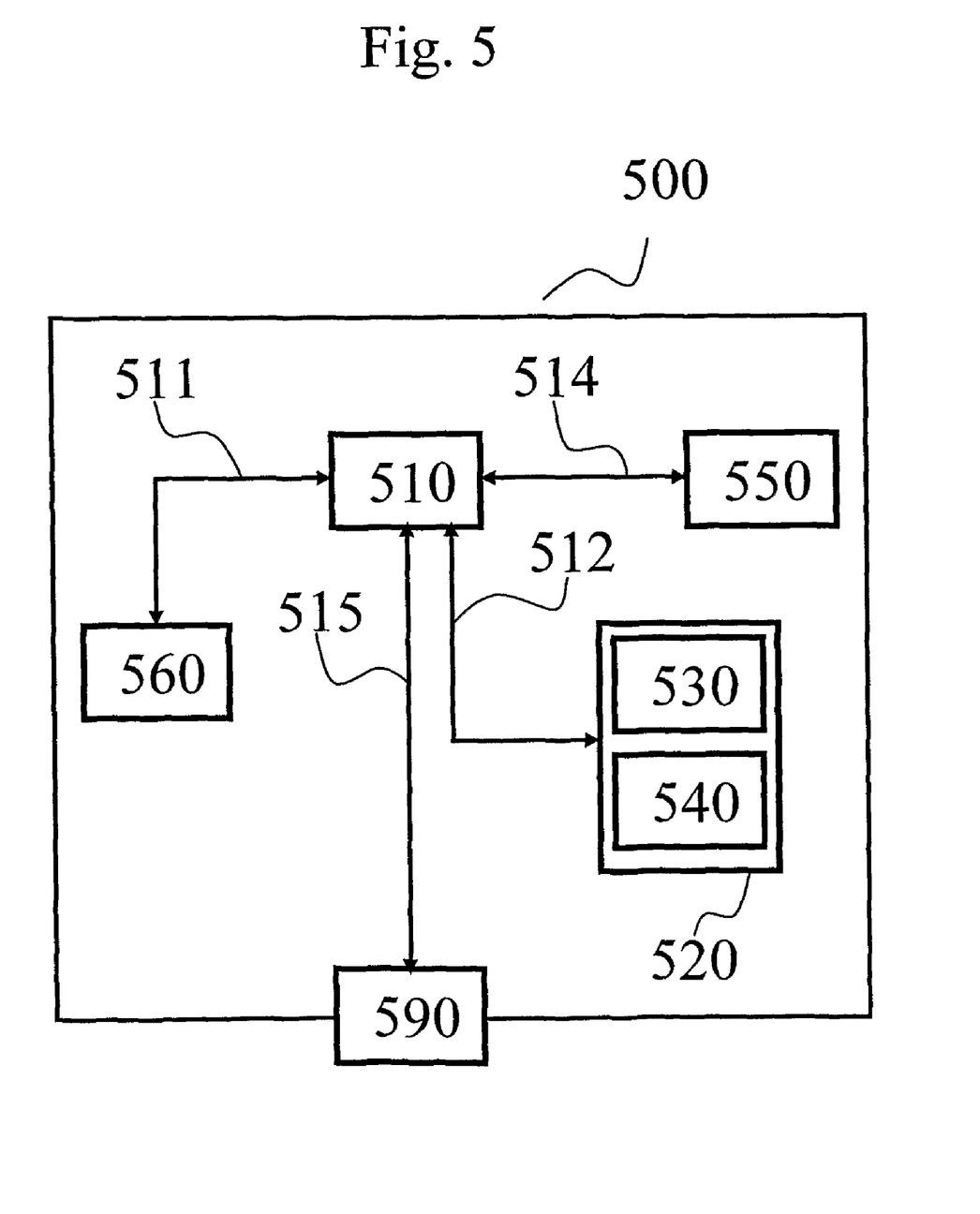
FIG. 5 shows an apparatus which is used at least in the two embodiments shown in FIGS. 1, 2 and 3.

FIG. 4 shows an apparatus 500, according to one embodiment of the invention, comprising a non-volatile memory 520, a processor 510 and a read/write memory 560. The memory 520 has a first memory part 530, in which a computer program for controlling the apparatus 500 is stored. The computer program in the memory part 530 for controlling the apparatus 500 may be an operating system.

The apparatus 500 may be incorporated into a control unit, for example, such as the control unit 11, 211 or 311. The data-processing unit 510 may comprise a microcomputer, for example.

The memory 520 also has a second memory part 540, in which a program is stored for controlling the exhaust gas aftertreatment system according to the invention. In an alternative embodiment the program for controlling the exhaust gas aftertreatment system is stored on a separate, non-volatile data storage medium 550, such as a CD, for example, or a replaceable semiconductor memory. The program may be stored in an executable form or in a compressed state.

Where the data-processing unit 510 is described below as running a special function, it should be clearly understood that the data-processing 510 runs a special part of the program that is stored in the memory 540 or a special part of the program that is stored on the non-volatile recording medium 550.

The data processing unit 510 is adapted for communication with the memory 550 through a data bus 514. The data processing unit 510 is also adapted for communication with the memory 520 through a data bus 512. The data processing unit 510 is furthermore adapted for communication with the memory 560 through a data bus 511. The data processing unit 510 is also adapted for communication with a data port 590 by means of a data bus 515.

The method according to the invention can be performed by the data processing unit 510 in that the data processing unit 510 runs the program, which is stored in the memory 540 or the program, which is stored on the non-volatile recording medium 550.

In an alternative embodiment of the invention the NOx catalytic converter 4 may consist, for example, of an urea SCR. The reducing agent in this case consists of urea, the diesel fuel of the engine and the urea each having to be stored in a separate tank. The diesel fuel is in this case used only for warming up the catalytic converter, through injection into the engine or a further separate injector arranged on the exhaust pipe.

In an alternative embodiment of the invention the oxidation catalytic converter 5, 25 or 35 may be integrated with the particle filter 6, 26 or 36 respectively. The entire particle filter or parts thereof may be coated with a catalytically active material which oxidizes NO to NO2.

In an alternative embodiment of the invention the particle filter and the NOx catalytic converter may be arranged in reverse order in the exhaust gas aftertreatment system.

In a further alternative embodiment of the invention the exhaust gas aftertreatment system may solely be comprised of an NOx catalytic converter with oxidation function or alternatively may consist solely of a CRT.

In a further alternative embodiment of the invention the injection of hydrocarbon may occur simultaneously both through the engine injectors and through one or more injectors arranged on the exhaust gas aftertreatment system.

The invention according to the present application can advantageously be applied not only to the aforementioned exhaust gas aftertreatment methods but also to at least the following:
  LNC (Lean NOx Catalyst), which continuously reduces nitrogen oxides under oxygen-rich conditions,
  precious metal-coated particle filters,
  hydrocarbon-based (HC-based) SCR (Selective Catalyst Reduction)

The hydrocarbon injected into the exhaust gas aftertreatment system is advantageously the fuel for the vehicle, which may be diesel fuel, gasoline, dimethyl ether (DME), methane (CNG) etc, but in the case of an injector on the exhaust pipe may also feasibly be a hydrocarbon from a separate tank, the hydrocarbon not being used to propel the vehicle.

The invention must not be regarded as being limited to the exemplary embodiments described above, a number of further variants and modifications being feasible without departing from the scope of the following claims.

The invention claimed is:

1. A method for maintaining oxidation of NO to NO2 in an oxidation catalytic converter arranged in a vehicle comprising an internal combustion engine, which in operation emits exhaust gases to an exhaust gas aftertreatment system comprising the oxidation catalytic converter, comprising:
  delivering a predetermined quantity of hydrocarbon to the exhaust gas aftertreatment system over at least one predetermined time interval, the quantity of hydrocarbon being delivered to the exhaust gas aftertreatment system through a fragmented injection with a fragmentation frequency in an interval 0.01 to 0.5 Hz, an injection period in an interval 1 to 10 seconds, and the fragmented injection is at an opening frequency of about 10-100 Hz; and
  using a shorter injection period at a higher fragmentation frequency to substantially maintain oxidation of NO to NO2 in the exhaust gas aftertreatment system at a level that prevailed immediately prior to the time interval for the hydrocarbon injection.

2. The method as claimed in claim 1, wherein the delivery of the hydrocarbon occurs via an injector arranged on the exhaust gas aftertreatment system.

3. The method as claimed in claim 1, wherein the delivery of the hydrocarbon to the exhaust gas aftertreatment system comprises a post-injection via at least one injector arranged in the engine.

4. The method as claimed in claim 1, wherein the hydrocarbon comprises fuel for the vehicle.

5. An engine-driven vehicle comprising:

an internal combustion engine, the engine in operation emitting exhaust gases to an exhaust gas aftertreatment system comprising an oxidation catalytic converter for oxidizing NO to NO2, a control unit and injectors, the injectors being adapted to inject hydrocarbon into the exhaust gas aftertreatment system, the control unit being adapted to inject a predetermined quantity of hydrocarbon via the injection elements over at least one predetermined time interval, wherein the control unit is further adapted to monitor and control the injection elements so that the hydrocarbon is delivered to the exhaust gas aftertreatment system through a fragmented injection with a fragmentation frequency in an interval 0.01 to 0.5 Hz, an injection period in an interval 1 to 10 seconds, and the injection element is arranged to inject hydrocarbon during fragmented injection at an opening frequency of about 10-100 Hz, the control unit being adapted to control the injectors to inject hydrocarbon over a shorter injection period as fragmentation frequency increases so that NO2 production in the exhaust gas aftertreatment system that prevailed immediately prior to the time interval for the hydrocarbon injection is substantially maintained.

6. The engine-driven vehicle as claimed in claim 5, wherein the injection element is an injector arranged on the exhaust gas aftertreatment system.

7. The engine-driven vehicle as claimed in claim 6, wherein the injection element is an injector arranged in the engine.

8. A computer program comprising program code for performing the steps of the method in claim 1, when the computer program is executed on a computer.

9. A computer program product comprising program code stored on a machine-readable medium for performing the steps of the method in claim 1, when the computer program is executed on the computer.

10. A computer program product that can be directly loaded into an internal memory in a computer, comprising a computer program for performing the steps of the method as claimed in claim 1, when the computer program on the computer program product is executed on the computer.

11. The method as claimed in claim 1, wherein each fragmented injection comprises more than one fragmentation cycle.

12. The engine-driven vehicle as claimed in claim 5, wherein the injection element is arranged to inject hydrocarbon so that the fragmented injection comprises more than one fragmentation cycle.

* * * * *